Nov. 23, 1954  E. G. SOFIO  2,694,835
PICKING AND SHREDDING MACHINE

Filed Nov. 2, 1950  2 Sheets-Sheet 1

INVENTOR
EDWARD G. SOFIO

BY
Semmes, Keegin, Robinson & Semmes
ATTORNEYS

Nov. 23, 1954 E. G. SOFIO 2,694,835
PICKING AND SHREDDING MACHINE
Filed Nov. 2, 1950 2 Sheets-Sheet 2
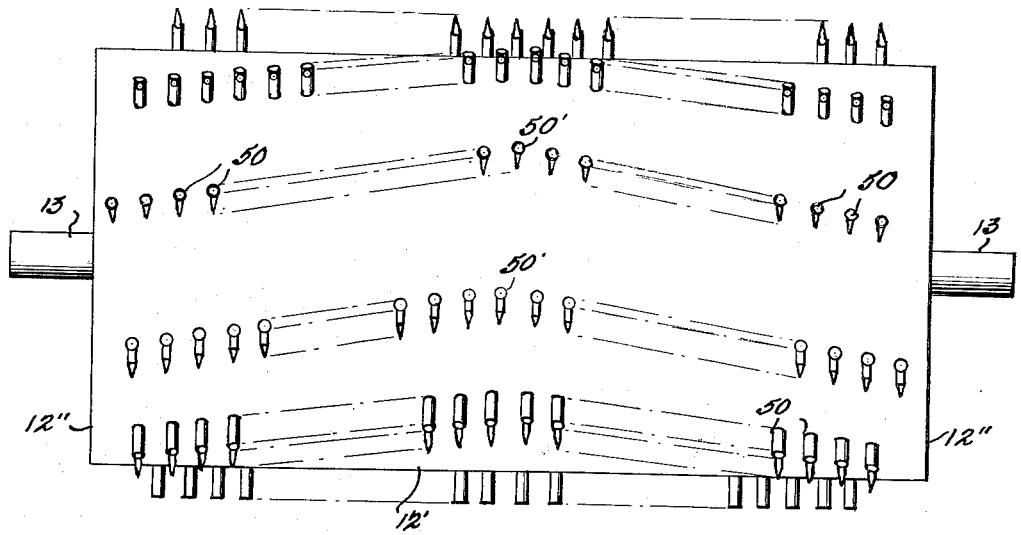
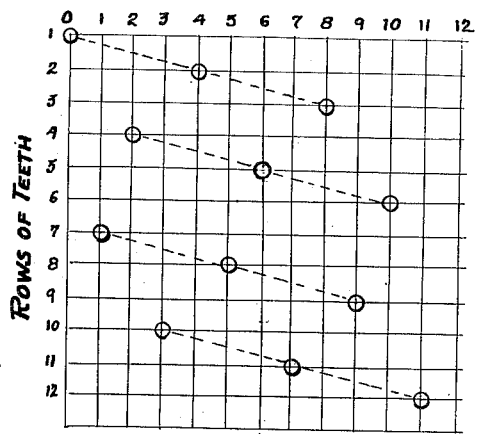
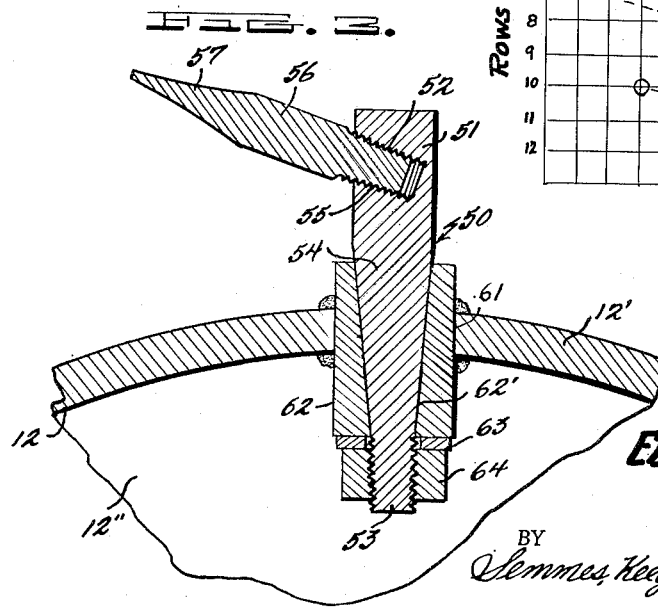
INVENTOR
EDWARD G. SOFIO
BY
Semmes, Keegin, Robinson & Semmes
ATTORNEYS

United States Patent Office 2,694,835
Patented Nov. 23, 1954

2,694,835

PICKING AND SHREDDING MACHINE

Edward G. Sofio, Baltimore, Md., assignor to Hercules Manufacturing Company, Incorporated, Baltimore, Md.

Application November 2, 1950, Serial No. 193,613

8 Claims. (Cl. 19—97)

This invention relates to fiber and material picking and shredding machines and has specific reference to an improved cylindrical working roll therefor.

Picking and shredding machines are designed for use in opening and mixing wool, rayon staple, reclaimed fibers, cotton and wool substitutes, as well as many other kinds of work such as picking hair, kapok, African fiber, southern moss, cotton for use in making explosives, and many mattress materials. Also heavy shredding may be carried out with such materials as burlap, gunny bagging, sugar bagging, old carpets, etc. Among the drawbacks inherent in machines heretofore built for this purpose are constant danger of fire, vibration due to uneven balance, shock in the driving mechanism, and need for frequent stops to clean out the machine.

These machines are always subject to fire hazards. Since the machines operate at very high speeds—upwards of 1000 R. P. M.—and are entirely constructed of metal, sparks are readily produced, especially when foreign matter such as bits of metal are passed therethrough. Of course, once a spark is created the loose fibers and dust around the machine can be easily ignited. Uneven balance in the machine not only causes vibration and reduces running efficiency but causes uneven wear on the bearings. This permanently damages the machine. Due to the intermittent grabbing action of the separate rows of teeth in conventional machines, sudden shocks are created in the driving mechanism, necessitating higher powered motors than if a more steady load could be placed on the driving mechanism. Most of these troubles are caused by the fact that the working cylinders of the machines are of built-up open construction and allow material to accumulate within the cylinders. In order to lessen the effects caused by this drawback, it is necessary to stop the machine and clean out the cylinder at frequent intervals.

Another drawback in the machine heretofore constructed is that the teeth provided have been made entirely of one piece and are set into a bar or lag having a milled slot to hold each tooth at its squared end. The bar is bolted into recesses provided in spiders so that the whole forms a cylinder. Consequently, when the point of the teeth wear out the whole tooth must be changed—a considerable expense in itself. Also, since a tooth of high tempered metal would be too expensive, the tooth usually provided is made of less expensive metal and has a very short life. In addition, the teeth have been held from turning by having flat surfaces which engage milled slots in the cylinder. If a tooth does turn as the result of striking a hard foreign substance, the milled slot in the bar is worn down so that another tooth cannot be properly fitted in the bar.

Therefore, it is a primary object of this invention to provide a working cylinder for a picking and shredding machine which is entirely closed so that the danger of fire is lessened and so that the cylinder will not become unbalanced due to accumulations of material inside the cylinder.

Another object of this invention is to provide a tooth for a machine of the class described which enables the construction of a light weight, closed cylinder rather than the open built-up cylinder.

Another object of this invention is to provide a working cylinder for picking and shredding machines which has teeth disposed so that all the teeth in a given row do not strike the material fed to it along a continuous line at the same moment, thus an even load on the driving mechanism of the machine is obtained.

Still another object of this invention is to provide a working cylinder for picking and shredding machines in which the teeth are disposed so that no two teeth pass through the same vertical plane and in which the vertical planes in which the teeth do pass are equidistant from one another.

Yet another object of this invention is to provide a tooth for a working cylinder of a machine of the character described which has a separable point of hardened metal which may be readily removed and replaced without removing the entire tooth from the cylinder.

A further object is to provide a tooth for a working cylinder of a machine of the character described which is less subject to causing sparks when striking foreign matter than teeth heretofore provided.

A still further object is to provide a tooth for a working cylinder of a machine of the character described which has a tapered shank for fitting snugly into a socket with a tapered bore which passes through and is secured in a hole in the surface of the cylinder for drawing said shank into the bore so that it will not turn in the bore and so that the tooth will not damage the bore if it does turn therein.

With these and other objects and advantages in view which will become more apparent during the course of the following description, the invention consists in the features and combinations hereinafter set forth.

In order to make the invention more fully understood preferred embodiments thereof have been made the subject of illustration in the accompanying drawings in which:

Figure 3 is an elevational cross section of a tooth of the present invention in position on the surface of the cylinder.

Figure 4 is a view of the cylinder of this invention showing the arrangement of teeth thereon; and Figure 5 shows a chart for figuring out the arrangement of teeth in succeeding rows on the cylinder.

In its broadest concept, the present invention embodies a fiber or material picking and shredding machine which has a completely closed working cylinder. It is contemplated that both the outer surface and the ends of the cylinder be entirely closed against the introduction of material being worked upon by the machine. It is further contemplated that the teeth on the cylinder be arranged so that the teeth in any given row do not initiate contact with the material all at one time. The teeth are arranged on the cylinder along a line diagonal to the central axis thereof and preferably in a herringbone pattern. The teeth used in the cylinder having a tapered shank which passes through a tapered locking socket on the surface of the cylinder for drawing the shank tightly into engagement therewith. A separate hardened point which may be removed and replaced as it is worn is secured to the shank.

Figure 1:
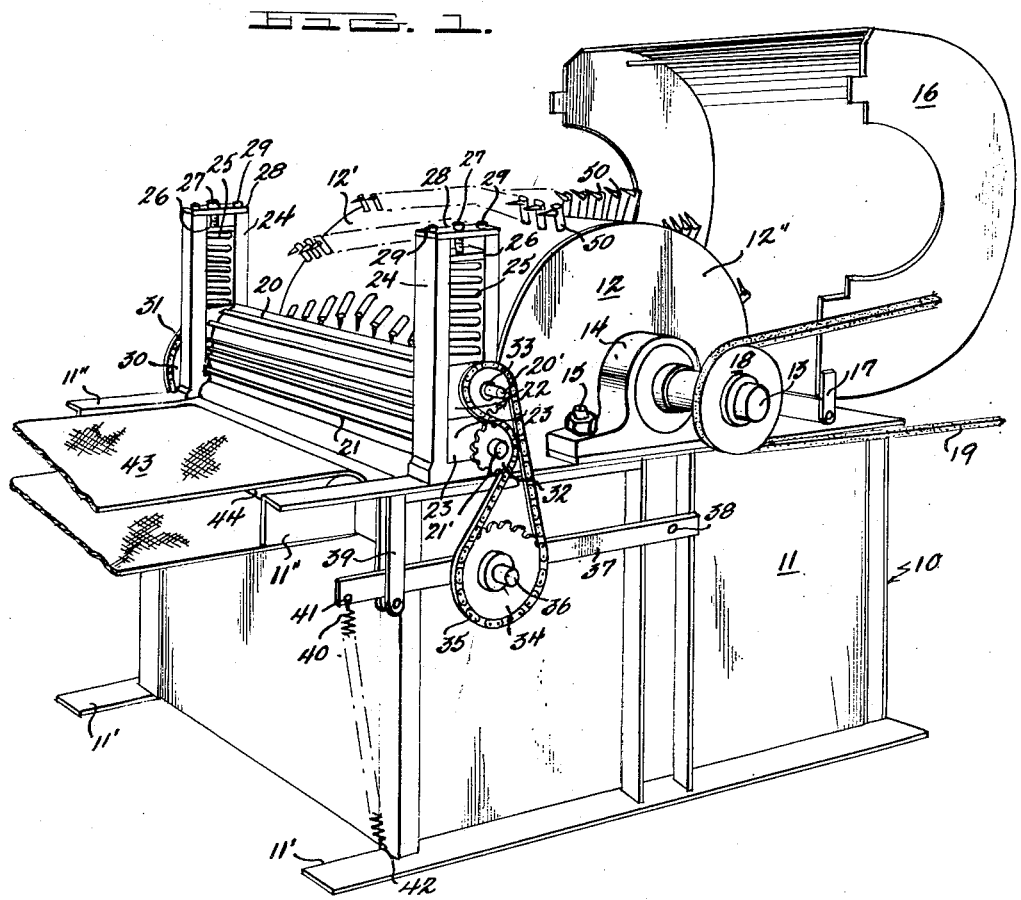
Figure 1 is a perspective view of a picking machine with the improved cylinder of this invention.
Figure 2:
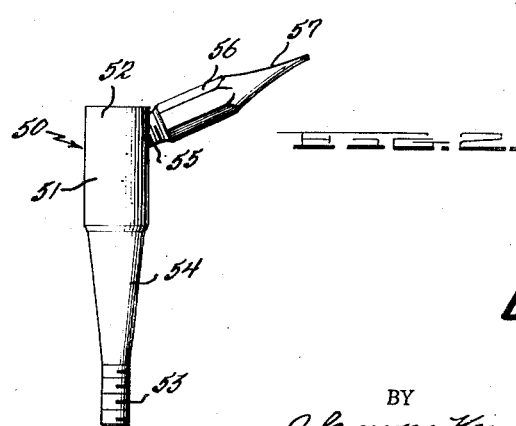
Figure 2 is an elevational view of one of the improved teeth used in the cylinder of the present invention.

Referring in particular to the drawings, Figure 1 shows a picking machine generally designated as 10. This machine comprises a frame 11 supported on bars 11' and having angle bars 11" along the upper edge thereof. A working cylinder 12 is supported by a shaft 13 which runs centrally therethrough. This cylinder has a continuous closed outer surface 12' and closed ends 12". The entire cylinder is preferably of all metal construction. A bracket 14 secured to the top of the frame on each side thereof by bolts 15 contains suitable journals for carrying the shank 13. A hood 16 is supported above the frame 11 by hinge members 17. This hood is closed when the machine is in operation. A driving wheel 18 is secured on the shaft 13 and driven by a belt 19 from a power source not shown. Below the hood and to the rear of the frame is an exit for material which has been treated by the machine and from which point the material is carried for further treatment if desired.

A simplified form of feed mechanism for the machine includes an upper fluted feed roll 20 and a lower fluted feed roll 21. These rolls are supported on shafts 20' and 21' respectively which are journalled in blocks 22 and 23 respectively which are slidably mounted in the standards 24. The standards 24 are carried on each side of the top of the frame 11 just forward of the brackets 14. The feed rolls and standards are also preferably of heavy metal construction. Compression springs 25 press upon the blocks 22 and 23 to provide proper tension between the feed rolls. A plate 26 limits the upward expansion of the spring and screw pin 27 passes through plate 26 in order to adjust the compression on the spring. An end plate 28 is fixed to the top of the standards 24 by screws 29 to carry the pin 27. A driving wheel 30 driven by belt 31 drives the lower feed roll 21 at one side of the feeding mechanism. On the other side of the feeding mechanism is a power transmission means which consists of driving sprocket 32, driven sprocket 33, idling sprocket 34 and chain 35. Driving sprocket 32 is carried on the end of the fluted roll 21 and driven sprocket 33 is carried on the end of fluted roll 20. The idling sprocket 34 runs on a short stud 36 carried on bar 37 which is pivoted at 38. The free end of the bar 37 rides in a slot provided between the frame 11 and a guard rail 39 to adjust the tension on the chain 35. A spring 40 is attached at one end to the bar 37 at 41 and at the other end to the base of the frame at 42.

In order to introduce material to the feeding rolls an apron, only part of which is shown, may be provided. This apron preferably has a belt type feed arrangement, including a belt surface 43 which is the same width as the cylinder and an end roll 44.

Carried by the cylinder 12 are numerous bifurcated teeth 50. These teeth consist of a shank 51 which has an enlarged end 52, a smaller screw threaded end 53 and a tapered intermediate section 54. An angular bore 55, which is screw threaded, is positioned at the large end of the shank toward the end thereof to receive a tooth head 56 which is made of the highest tempered alloy steels for longer wear. This head 56 may also be made of stainless steel or other abrasion resisting, non-sparking metal such as beryllium copper or alloy bronze, etc, to cut down the likelihood of sparking should the head strike another hard object and cut down fire hazard. The head 56 is pointed as shown at 57 for easy penetration of the fiber or other material being operated upon and is screw threaded at the reverse end so that it may be fixed in the bore 55 within the shank 51. Because of the long narrow point and the angle at which the head is set in the shank a greater combing effect of the material being treated is achieved than with conventional teeth.

Figure 3 shows the tooth of this invention secured to outer surface 12' of the cylinder 12. The surface 12' is provided with a hole 61. A tapered locking socket 62 is permanently welded in the hole through the cylinder surface to receive the tooth. This locking socket 62 has a tapered inner bore 62' for receiving the shank, which extends through to the inside of the cylinder 12. After each socket 62 is welded to the cylinder it is machined so that its tapered bore 62' will be exactly radial to the longitudinal axis of the cylinder and so that the teeth will be eqidistant from said axis when positioned on the cylinder. It should be noted that in conventional cylinders having a straight bar or lag which is set at an angle to the longitudinal axis of the cylinder and which is drilled and milled for a straight row of teeth, the teeth are not radial to the axis of the cylinder nor equidistant therefrom. Thus the teeth are not at the same angle to the material to be pulled, nor equidistant therefrom. A washer 63 and nut 64 are then placed over the shank at the screw threaded end thereof and drawn up tight. In this way, the tooth is held securely on the surface 12' of the cylinder 12 so that it will not rotate within the hole 61. A tighter fit is obtained by tapping the enlarged end of the shank 52 and drawing up the nut 64 at the same time. It will be seen that if the head of the tooth should become worn at the point, the head may be unscrewed and a new head inserted in the shank. This eliminates the need for removing the entire tooth from the cylinder surface. Also, if the shank should become damaged or turn within the hole 61 of the surface 12', no damage occurs to the hole 61. The entire tooth may be removed and a new tooth readily inserted so that it will be fixed in its proper position as firmly as was the previous tooth without too high tolerances being required.

It should be noted that the all-closed working cylinder is only possible because of the type of teeth employed. Heretofore, cylinders have been of built-up construction having a central shaft with spiders spaced therealong and with wooden or other lags secured to the circumference of the spiders. The teeth were bolted or otherwise secured to sockets in the lags. This was necessary because if a tooth in a given row got twisted and it damaged the sockets in which it was set the whole lag, or a part thereof, had to be replaced before a new tooth could be inserted. Of course, it was impractical to try to construct a closed cylinder built along these lines because the resulting cylinder would be so heavy. Using the teeth of applicant's invention, it became practical to construct a cylinder similar to a metal drum with tapered holes therein for receiving the teeth. The use of a metal drum with the conventional teeth would have meant that a new tooth could not be inserted when a socket was rounded off by a twisting tooth. Since it would not be feasible to replace the damaged cylinder by a new one until a great number of teeth had to be removed, the cylinder would have to be used with many teeth missing. This would mean inefficiency in the machine and it would throw the machine out of proper balance.

Figure 4 shows the teeth arranged in a herringbone pattern about the circumference of the cylinder 12. In this manner, when the cylinder rotates only a few teeth at a time in each row initially make contact with the material being operated upon as the cylinder revolves in the machine. The teeth on the extreme ends of each row make contact first as the row approaches the material being operated upon, the inner teeth of the row successively coming in contact with the material as the drum is further rotated until the apex tooth 50' of the herringbone reaches the point of contact with the material coming through the feed rolls. Shortly after the apex tooth 50' of each row contacts the material during a revolution of the cylinder, then the teeth at the extreme ends of the next row begin to enter the material coming through the feed rolls of the machine. In this manner only a relatively constant load is required of the driving mechanism of the machine, and the intermittent shocks which occur in conventional machines when the teeth are exposed in rows parallel to the longitudinal axis of the cylinder, are eliminated. The elimination of this shock load reduces the power consumption and cuts down on the wear of the machine. Another advantage derived from eliminating the shock load is that a single pair of feed rolls are thereby enabled to hold the material, whereas formerly three or four rolls have been required to withstand the shock of the straight line of teeth grabbing the material from the feed rolls and feed the material properly to the working cylinder. In addition, no lumps and chunks of unopened stock occur in the product of the machine. The unique design of this cylinder with its herringbone pattern assures perfect shear action picking. In other words, the material being fed through the feed rolls is sheared from both ends toward the center thereof as each row of teeth on the cylinder 12 meets the material passed through by the rolls.

In order to assure perfect balance in the operation of this machine and uniform picking, the teeth are further arranged in each row according to a geometric pattern. It has been planned that no two teeth in this cylinder shall pass through the same vertical plane and also that the vertical planes through which the teeth do pass will be equidistant from each other. This assures equal load on the machine and uniform quality in the final product. For example, a preferred method of arranging the teeth properly is charted in Figure 5. If a cylinder 12 were to have 12 rows of teeth we put 12 spaces down on the left side of the chart and 12 spaces along the upper edge of the chart. Each of these 12 upper spaces represents $\frac{1}{12}$ of the distance between adjacent teeth of a single row. Starting with the two teeth on the extreme left end of a given row, the first tooth on the left end of the next succeeding row will be in a vertical plane passing through a point $\frac{4}{12}$ of the distance between the two starting teeth. The first tooth at the left end of the third row of teeth will be in a vertical plane passing through a point $\frac{8}{12}$ of the way between the first two starting teeth. The first tooth in the fourth row will be in a vertical plane passing through a point $\frac{2}{12}$ of the distance between the first two starting teeth and so forth and so on. By the time the twelfth row is reached, all the teeth will be placed so that they pass through different vertical planes equally spaced from each other.

While the invention has been described with reference to particular embodiments, it is contemplated that modifications thereof may be made without departing from the spirit of the invention. Accordingly, it is intended that the scope of the invention be limited only as defined in the appended claims.

I claim:

1. A tooth for picking and shredding machines having a surface with a hole therein for receiving said tooth, comprising a shank bifurcated at one end and screw threaded at the other, said shank being tapered intermediate the ends thereof to pass through said hole, and means for securing said shank to the surface.

2. A tooth for picking and shredding machines having a surface with a hole therein for receiving said tooth, comprising a shank having one end of larger cross section than the other, said shank being toothed at the larger end and tapered toward the other end to make a snug fit in said hole, a locking socket secured in the hole for receiving the tapered shank, and means for securing the shank to the surface.

3. A tooth for picking and shredding machines having a surface with a hole therein for receiving said tooth, comprising a shank having one end of larger cross section than the other, said shank being toothed at the larger end and tapered toward the other end to make a snug fit in said hole, a tapered locking socket secured in the hole for receiving the shank, and means for securing the shank to the surface.

4. A tooth for picking and shredding machines having a surface with a hole therein for receiving said tooth, comprising a shank having one end of larger cross section than the other, said shank being toothed at the larger end and screw threaded at the other end, said shank being tapered intermediate the ends to make a snug fit in said hole, a tapered locking socket for receiving the shank, and a nut for securing the shank to the surface.

5. A tooth for picking and shredding machines having a surface with a hole therein for receiving said tooth, comprising a shank, a head secured to one end of the shank, said shank tapering toward the other end to pass through the hole, a locking collar to draw said shank into said hole, and means for securing the shank to the surface.

6. In a picking and shredding machine, a toothed cylinder comprising a rotatable supporting shaft, a closed cylindrical surface about said shaft and carried thereby, said cylindrical surface having holes therethrough, arranged in rows equally spaced around the cylinder and extending diagonal to the longitudinal axis of the latter, the holes of each row being displaced longitudinally of the holes in the preceding row, teeth mounted in respective holes in said cylindrical surface, said teeth comprising shanks mounted in respective holes with one end projecting radially from said cylindrical surface, and a separable, pointed tooth head carried by the projecting end of each shank and disposed at a forwardly directed angle with respect to the direction of rotation of said cylinder, all of said heads lying equidistant from the axis of the cylinder.

7. Apparatus as claimed in claim 6, wherein each of said holes is tapered inwardly toward the axis of the cylinder, and each shank is correspondingly tapered to fit snugly in respective holes, said tapered ends being screw threaded at their extremities, and nuts for securing said ends in place.

8. Apparatus as claimed in claim 6, wherein each of said holes is provided with a locking socket having a coaxial bore which tapers inwardly toward the axis of the cylinder, and the mounting end of each shank is correspondingly tapered to fit snugly in the respective tapered bores, said tapered ends being screw threaded at their extremities, and nuts for securing said ends in place in said sockets.

References Cited in the file of this patent

UNITED STATES PATENTS

| Number | Name | Date |
|---|---|---|
| 669,084 | Haynes | Mar. 5, 1901 |
| 1,656,432 | Elliott | Jan. 17, 1928 |
| 1,790,339 | Chandler | Jan. 27, 1931 |
| 2,014,673 | Setzer | Sept. 17, 1935 |
| 2,028,919 | Parker | Jan. 28, 1936 |
| 2,274,360 | Conley | Feb. 24, 1942 |
| 2,295,762 | Schultze | Sept. 15, 1942 |

FOREIGN PATENTS

| Number | Country | Date |
|---|---|---|
| 112,377 | Germany | Aug. 16, 1909 |
| 369,839 | Germany | Feb. 23, 1923 |